US007910880B2

(12) United States Patent
Mukaibatake et al.

(10) Patent No.: US 7,910,880 B2
(45) Date of Patent: Mar. 22, 2011

(54) MASS SPECTROMETER

(75) Inventors: Kazuo Mukaibatake, Kyoto (JP); Shiro Mizutani, Kyoto (JP)

(73) Assignee: Shimadzu Corporation, Kyoto-shi, Kyoto (JP)

( * ) Notice: Subject to any disclaimer, the term of this patent is extended or adjusted under 35 U.S.C. 154(b) by 215 days.

(21) Appl. No.: 11/908,555

(22) PCT Filed: Mar. 10, 2006

(86) PCT No.: PCT/JP2006/304707

§ 371 (c)(1), (2), (4) Date: Sep. 13, 2007

(87) PCT Pub. No.: WO2006/098230

PCT Pub. Date: Sep. 21, 2006

(65) Prior Publication Data

US 2009/0026366 A1 Jan. 29, 2009

(30) Foreign Application Priority Data

Mar. 15, 2005 (JP) ................................ 2005-072273

(51) Int. Cl.
*B01D 59/00* (2006.01)
*B01D 59/44* (2006.01)

(52) U.S. Cl. ........ 250/288; 250/281; 250/282; 250/290; 250/291

(58) Field of Classification Search .................. 250/281, 250/282, 284, 288, 290, 291, 292
See application file for complete search history.

(56) References Cited

U.S. PATENT DOCUMENTS 6,462,338 B1 * 10/2002 Inatsugu et al. .............. 250/292
6,534,764 B1 * 3/2003 Verentchikov et al. ........ 250/287
2004/0046124 A1 3/2004 Derrick et al.

FOREIGN PATENT DOCUMENTS

JP 11307040 A 11/1999
(Continued)

OTHER PUBLICATIONS

International Search Report of PCT/JP2006/304707, date of mailing Jun. 13, 2006.

(Continued)

*Primary Examiner* — David A Vanore
(74) *Attorney, Agent, or Firm* — Westerman, Hattori, Daniels & Adrian, LLP

(57) ABSTRACT

In conventional mass spectrometers, if ions are converged by a radio-frequency electric field under the condition of relatively high gas pressure, the ions are decelerated and are delayed, or stagnated in an extreme case, to cause a decrease in the detection sensitivity or an appearance of a ghost peak. By contrast, in the mass spectrometer according to the present invention, lens electrodes 40 comprises four plate-shaped electrodes 41*a* through 41*d*, which are radially arranged around the ion optical axis C at intervals of 90 degrees from each other; the four electrodes placed in the plane being approximately perpendicular to the ion optical axis C form a group, and a plurality of the groups are arranged along the ion optical axis C direction at approximately even intervals. The radio-frequency voltages each applied to each of any pair of electrodes adjacent along the direction of the ion optical axis C have a given amount of phase shift. With this configuration, when ions enter the lens electrode 40, an ion acceleration effect is exerted in accordance with the amount of phase shift of the adjacent radio-frequency electric fields, and the ions are sequentially accelerated as they travel through the lens electrode 40. Consequently, a delay or stagnation of the ions can be avoided.

9 Claims, 4 Drawing Sheets

FOREIGN PATENT DOCUMENTS

| | | | |
|---|---|---|---|
| JP | 2000123780 | A | 4/2000 |
| JP | 2000149865 | A | 5/2000 |
| JP | 3379485 | B2 | 12/2002 |
| JP | 2004520685 | A | 9/2007 |
| WO | 200243105 | A1 | 5/2002 |
| WO | 2004023516 | A1 | 3/2004 |

OTHER PUBLICATIONS

Japanese Office Action dated Jul. 6, 2010, issued in corresponding Japanese Patent Application No. 2007-508101.

Notice of Rejection dated Sep. 28, 2010, issued in corresponding Japanese Patent Application No. 2007-508101.

* cited by examiner

MASS SPECTROMETER

TECHNICAL FIELD

The present invention relates to a mass spectrometer, more specifically, to an ion optical system for transporting ions to a subsequent stage in a mass spectrometer.

BACKGROUND ART

In general, in a liquid chromatograph mass spectrometer, which is a combination of a liquid chromatograph and a mass spectrometer, an atmospheric pressure ionization, such as an electrospray ionization (ESI) and atmospheric pressure chemical ionization (APCI), is used to generate gas ions from a liquid sample. In the spectrometer of this kind, while the ionization chamber is in an approximately atmospheric pressure, an analysis chamber internally equipped with a detector and a mass analyzer such as a quadrupole mass filter is required to be maintained in a high vacuum state. For this purpose, a differential evacuation system having one or more intermediate vacuum chambers between the analysis chamber and the ionization chamber is used for increasing the vacuum degree in a stepwise manner.

FIG. 6 is a schematic block diagram of the main portion of a conventional LC/MS as disclosed in Patent Document 1 or other documents. This mass spectrometer includes an ionization chamber 11 provided with a nozzle 12 connected, for example, to a column outlet end of a liquid chromatograph (not shown), an analysis chamber 21 internally equipped with a quadrupole mass filter 22 and a detector 23, a first intermediate vacuum chamber 14, and a second intermediate vacuum chamber 18. The first and second intermediate vacuum chambers 14 and 18 are located between the ionization chamber 11 and the analysis chamber 21, and are separated from each other by a partition wall. The ionization chamber 11 and the first intermediate chamber 14 communicate with each other only thorough a desolvation pipe 13 having a small diameter, and the first intermediate vacuum chamber 14 and the second intermediate vacuum chamber 18 communicate with each other only thorough a skimmer 16 having a passage hole (orifice) 17 with an extremely small diameter on top of it.

The internal space of the ionization chamber 11 serving as an ion source is maintained in an approximately atmospheric pressure (about $10^5$ [Pa]) by vaporized molecules of a sample solution continuously supplied thereto from the nozzle 12. The internal space of the first intermediate vacuum chamber 14 as a second stage is evacuated to a low vacuum state of approximately $10^2$ [Pa] by a rotary pump 24. The internal space of the second intermediate vacuum chamber 18 as a third stage is evacuated to a medium vacuum state of about $10^{-1}$ to $10^{-2}$ [Pa] by a turbo-molecular pump 25, and the internal space of the analysis chamber 21 as the last stage is evacuated to a high vacuum state of about $10^{-3}$ to $10^{-4}$ [Pa] by another turbo-molecular pump 26. That is, the multistage differential evacuation system in which the vacuum degree of each chamber increases in a stepwise manner from the ionization chamber 11 to the analysis chamber 21 enables the internal space of the analysis chamber 21 as the last stage to be maintained in a high vacuum state.

An operation of this mass spectrometer will be described in outline: A sample solution is sprayed (electrosprayed) from the tip of the nozzle 12 into the ionization chamber 11 while being electrically charged, and molecules of the sample are ionized in the course of vaporization of the solvent in the droplets. The droplets mixed with ions are drawn into the desolvation pipe 13 due to the pressure difference between the ionization chamber 11 and the first intermediate vacuum chamber 14. In the course of passing through the heated desolvation pipe 13, the solvent is further vaporized and the ionization is accelerated. A first lens electrode 15 having a plurality of (four) plate-shaped electrodes arranged in three rows in a sloped manner is located in the first intermediate vacuum chamber 14. This electrode generates an electric field for helping draw the ions through the desolvation pipe 13 and converge the ions around the orifice 17 of the skimmer 16. The ions introduced into the second intermediate vacuum chamber 18 through the orifice 17 are converged by an octapole-type second lens electrode 19 comprising of eight rod electrodes, and sent to the analysis chamber 21. In the analysis chamber 21, only the ions having a specific mass-to-charge ratio (mass/charge) pass thorough the longitudinal space of the quadrupole mass filter 22, and the remaining ions having other mass-to-charge ratios diverge on the way. Then, the ions which have passed through the quadrupole mass filter 22 reach the detector 23, and the detector 23 provides an ionic strength signal corresponding to the amount of the received ions.

In the previously-described mass spectrometer, the first lens electrode 15 and the second lens electrode 19 are collectively called "ion optical system". Their major function is to converge flying ions with an electric field, and, in some cases, accelerate and send the ions to the subsequent stage. Heretofore, various configurations have been proposed for such lens electrodes. In the example illustrated in FIG. 6, the second lens electrode 19 arranged in the second intermediate vacuum chamber 18 is a multi-rod type as shown in FIG. 7 (while the number of the rods in this example is eight, it may be any even number such as four or six). In this case, a voltage consisting of a radio-frequency AC voltage having an inversed phase superimposed on the same DC voltage is applied to each of the adjacent rod electrodes. Thus, ions introduced along the direction of the ion optical axis C travel while being oscillated at a given frequency by the radio-frequency electric field. This configuration generally has high ability to converge ions; that is, it is capable of sending more ions to the subsequent stage.

With this differential evacuation system, the intermediate vacuum chamber (or chambers) is maintained in a low vacuum (high gas pressure) state, while the mass analysis chamber is maintained in a high vacuum (low gas pressure) state. When ions fly thorough a space of relatively high gas pressure, the kinetic energy of the ions decreases due to the collision with gas molecules existing in the space, resulting in a drop of the flight speed. In particular, when a radio-frequency electric field is applied within the space by the lens electrode as previously described, ions have more chances to collide with the gas molecules because the ions are oscillated by the radio-frequency electric field, and the ions may halt if the length of the radio-frequency electric field is large.

When the flight speed of the ions decreases as previously described, the time for the ions to reach the detector differs even among the ions having the same mass-to-charge ratio, and this causes a decrease in the detection sensitivity and a broadening of a peak. Additionally, when measurements are repeatedly carried out in a scan measurement, SIM (Selective Ion Monitoring) measurement, or other measurements, the ions remaining in the ion optical system may reach the detector in the subsequent measurement and cause a ghost peak, i.e. a peak that appears at a point in time where any peak should not actually appear. The similar problem may possibly occur in the first lens electrode 15; however, this problem is not likely to happen in practice in the first intermediate vacuum chamber 14 because the kinetic energy of the ions is adequately large.

The similar problem is also likely to occur in a tandem mass spectrometer for MS/MS (or $MS^n$) analysis, as well as in the aforementioned type of mass spectrometer in which an atmospheric pressure ionization is used. FIG. 8 is a schematic block diagram of such a mass spectrometer. This mass spectrometer has three stages of quadrupole rod sets 30, 32 and 33 arranged along the ion passageway. The quadrupole rod set 30 in the first stage and the quadrupole rod set 33 in the third stage each function as a quadrupole mass filter for selecting the mass-to-charge ratio of the passing ions as with the quadrupole mass filter 22 in FIG. 6. The quadrupole rod set 32 in the second stage is contained in a collision chamber 31 to which a gas is supplied. When ions are introduced from the left in the figure, only the ions having a specific mass-to-charge ratio are selected by the quadrupole rod set 30 and introduced into the space surrounded by the quadrupole rod set 32 in the second stage. Here, the ions selected in the previous stage collide with gas molecules and are then dissociated. Next, a variety of daughter ions generated according to the dissociation manner are introduced into the quadrupole rod set 33 in the third stage. Finally, the daughter ions having a specific mass-to-charge ratio are selected by the quadrupole rod set 33 in the third stage and reach the detector 34.

In general, only a radio-frequency voltage devoid of a DC voltage is applied to the quadrupole rod set 32 in the second stage so that ions of any mass-to-charge ratio can pass through this stage. However, since the gas pressure of the second stage's internal space is relatively high due to the collision-induced dissociation (CIO) gas which is abundantly supplied, the decrease of the ions' kinetic energy is significant. Hence, if the quadrupole rod set 32 in the second stage is elongated, the ions may stagnate, which causes problems such as the decrease in the detection sensitivity and the appearance of a ghost peak as in the case previously described.

[Patent Document 1] Japanese Patent Publication No. 3379485

DISCLOSURE OF THE INVENTION

Problem to be Solved by the Invention

The present invention is accomplished in view of the aforementioned problems and aims to provide a mass spectrometer capable of performing a measurement with high sensitivity and without problems of a ghost peak and the like, by preventing the delay or stagnation of ions associated with the decrease of their kinetic energy even in the case where ions are converged by a radio-frequency electric field in a low-vacuum atmosphere.

Means for Solving the Problems

The first aspect of the present invention to solve the previously-described problems is a mass spectrometer including:

an ion source for generating ions;

a mass analyzer for separating the ions with respect to mass-to-charge ratio; and an ion optical system located on an ion passageway between the ion source and the mass analyzer, for converging ions and introducing the ions to the mass analyzer, where:

the ion optical system includes M groups of N plate-shaped electrodes which are thin in an ion optical axis direction (where M is an integral number of three or more, and N is an even number of four or more), the N electrodes are arranged around the ion optical axis, and the M groups of electrodes are arranged in a multistage form so as to be separated from each other along the ion optical axis direction, and a radio-frequency voltage is applied to the electrodes of each group so that the phases of radio-frequency electric fields each generated in a space surrounded by each group of electrodes are shifted in sequence along the ion optical axis direction.

A first mode of the mass spectrometer according to the first aspect of the present invention includes a voltage-applying unit for generating radio-frequency voltages whose phases are shifted in sequence along the ion optical axis direction and applying each radio-frequency voltage to the electrodes of each group.

As a second mode of the mass spectrometer according to the first aspect of the present invention, the electrodes of each of the groups may be rotated by a predetermined degree around the ion optical axis in sequence along the ion optical axis direction, instead of actually shifting the phase of each of the applied voltages, whereby the phases of the radio-frequency electric fields are shifted in sequence along the ion optical axis direction.

The second aspect of the present invention to solve the previously-described problems is a mass spectrometer including:

an ion source for generating ions;

a mass analyzer for separating the ions with respect to mass-to-charge ratio; and an ion optical system located on an ion passageway between the ion source and the mass analyzer, for converging ions and introducing the ions to the mass analyzer, where:

the ion optical system includes M groups of N plate-shaped electrodes which are thin in an ion optical axis direction (where M is an integral number of three or more, and N is an even number of four or more), the N electrodes are arranged around the ion optical axis, and the M groups of electrodes are arranged in a multistage form so as to be separated from each other along the ion optical axis direction, and the mass spectrometer includes a voltage-applying unit for applying a voltage composed of a radio-frequency voltage and a low-frequency voltage superimposed on each other, to each electrode of each group, where the phases of the low-frequency voltages are shifted in sequence along the ion optical axis direction.

Effect of the Invention

In the mass spectrometer according to the first aspect of the present invention, when ions enter the radio-frequency electric field produced by the ion optical system, kinetic energy is given to the ions because of the potential difference which is generated owing to the phase difference between the radio-frequency electric field formed by one group of electrodes immediately before the ions' location at a certain point in time and the radio-frequency electric field formed by one group of electrodes immediately after the location. Accordingly, as the ions proceed, kinetic energy is sequentially given to them, and the ions are accelerated. In addition, the ions are vibrated by the radio-frequency electric field to converge around the central axis (i.e. ion optical axis).

Therefore, with the mass spectrometer according to the first aspect of the present invention, even in an atmosphere of relatively high pressure caused by many gas molecules, the ions are accelerated because the kinetic energy is given by the ion optical system, while they are decelerated by losing the kinetic energy due to the collision with gas molecules. Consequently, it is possible to prevent the ions from being delayed or stagnated when passing through the ion optical system. This reduces the problem in which the ions having the mass-to-charge ratio to be analyzed temporally spread to reach the detector, and the detection sensitivity of the ions is therefore improved.

Owing to the reduction of the ions' transit time, almost all the ions introduced into the ion optical system in one measurement pass through the ion optical system. Therefore, even in the case where the measurement is repeated, it is possible to avoid the appearance of the ions which stagnate in the ion optical system in the next or subsequent measurements. Hence, the appearance of a ghost peak on a mass spectrum can be avoided. Furthermore, since the time intervals in a repetitive measurement, such as a scan measurement and SIM measurement, can be shortened, the measurement efficiency is improved. And simultaneously, it is possible to capture the sudden change of signals in the analysis performed in combination with a gas chromatograph (GC) or liquid chromatograph (LC).

Unlike a time-of-flight mass spectrometer, a mass spectrometer using a mass analyzer such as a quadrupole mass filter does not require strict control of the velocity of the ions passing through the ion optical system. However, in order to optimally accelerate the ions, in the configuration of the aforementioned first embodiment, the voltage-applying unit may preferably change the amount of phase shift of the radio-frequency voltage applied to the electrodes of each of the groups in accordance with the mass-to-charge ratio of the ions. However, even if the amount of phase shift is predetermined regardless of the mass-to-charge ratio, a variety of ions can be accelerated to a sufficient extent for a practical use.

As previously described, a radio-frequency electric field has the effect of converging ions and this effect differs in accordance with the mass-to-charge ratio of the ions. Therefore, the frequency of the radio-frequency voltage applied to the electrodes of each of the groups may preferably be changed in accordance with the mass-to-charge ratio of the ions. With this frequency control, a variety of ions can be optimally or nearly optimally converged and accelerated, and then efficiently sent to the subsequent stage.

In the mass spectrometer according to the second aspect of the present invention, unlike in the first aspect of the present invention, the phases of the radio-frequency electric fields having an effect to converge ions are not basically shifted. Instead, the phases of the low-frequency voltages, each of which is superimposed on the radio-frequency voltage to be applied to each electrode for forming a radio-frequency electric field, are shifted in sequence along the ion optical axis direction. With this phase control, as in the first aspect of the present invention, when ions enter the electric field produced by the ion optical system, kinetic energy is given to the ions due to the potential difference which is generated due to the phase difference between the low-frequency electric field formed by one group of electrodes immediately before the ions' location at a certain point in time and the low-frequency electric field formed by one group of electrodes immediately after the location. Accordingly, as the ions proceed, kinetic energy is sequentially given to them, and the ions are accelerated. The similar effects of the first aspect of the present invention are accordingly achieved.

The ion optical system in the mass spectrometer according to the first and second aspects of the present invention is particularly effective when ions are converged and delivered under the atmosphere of relatively high gas pressure. A specific and useful example is a mass spectrometer including a collision cell for making ions collide with gas molecules so as to accelerate a dissociation of the ion, wherein the ion optical system is used as the collision cell. Another useful example is a mass spectrometer in which: the ion source has an ionization chamber for ionizing a liquid sample in an atmosphere of atmospheric pressure; the mass spectrometer has one or more intermediate vacuum chambers between the ionization chamber and an analysis chamber maintained in a high vacuum atmosphere in which the mass analyzer is located; and the intermediate vacuum chambers are separated from each other by a partition wall, where the ion optical system is located inside the intermediate vacuum chamber.

BEST MODES FOR CARRYING OUT THE INVENTION

First Embodiment

An embodiment of a mass spectrometer according to the present invention (the first embodiment) is hereafter described with reference to the drawings. The fundamental configuration of the mass spectrometer according to this embodiment is the same as the previously described one shown in FIG. 6. However, the configuration of the ion optical system located inside the second intermediate vacuum chamber 18 is different from that of FIG. 6. Therefore, the difference will be described in detail.

Figure 1:
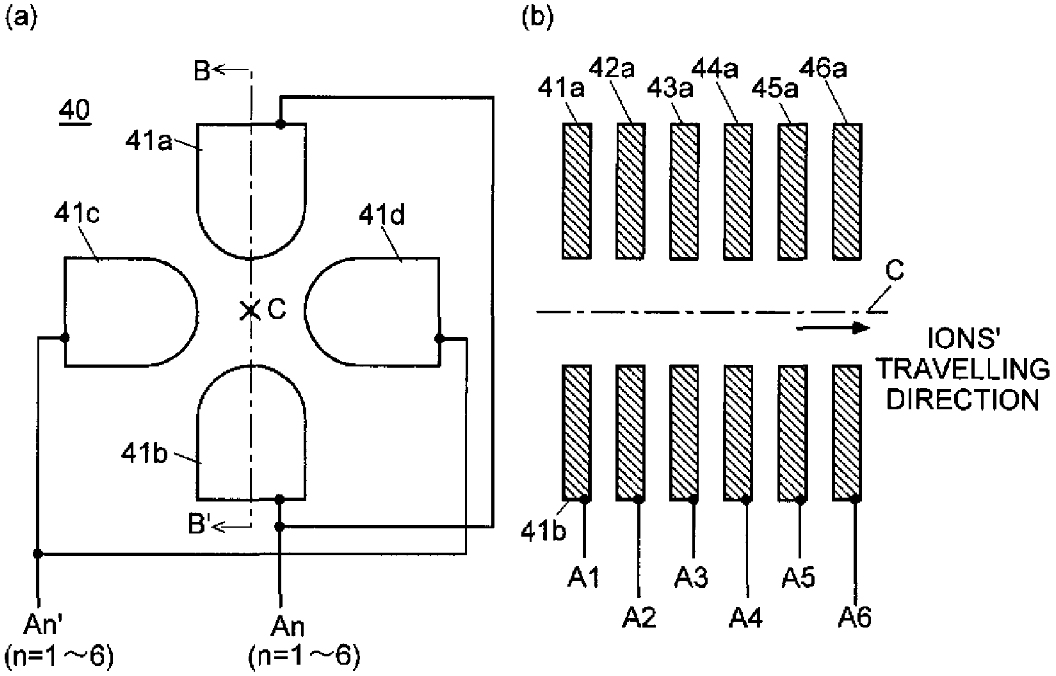
FIG. 1(*a*) is a schematic diagram of a second lens electrode in a mass spectrometer according to an embodiment of the present invention (the first embodiment) viewed from the incoming direction of ions, and FIG. 1(*b*) is an end view of the same lens electrode viewed with the arrows B-B' of FIG. 1(*a*).

FIG. 1(*a*) is a schematic diagram of the second lens electrode 40 in the mass spectrometer according to this embodiment viewed from the incoming direction of ions, and FIG. 1(*b*) is an end view of the same lens electrode viewed with the arrows B-B' of FIG. 1(*a*).

In the second lens electrode 40 according to this embodiment, as shown in FIG. 1(*a*), four plate-shaped electrodes (indicated with numerals 41*a* through 41*d*) are radially arranged around the ion optical axis C at intervals of 90 degrees from each other. One side of each electrode is semicircular, and the semicircular side is facing toward the ion optical axis C. Four electrodes placed in the plane being approximately perpendicular to the ion optical axis C form a group, and six groups are arranged along the ion optical axis C direction at approximately even intervals. Although every group here has a quadrupole configuration with four electrodes, the group may have even-numbered electrodes of four or more to make a hexapole, octapole, and the like configuration. The number of groups arranged along the ion optical axis C may be any number more than three, instead of six.

In the four electrodes 41*a* through 41*d*, which forms the second lens electrode 40, the electrodes opposed across the ion optical axis C are connected to each other. From a voltage-applying circuit, which is not shown, a radio-frequency voltage An having a given frequency f is applied to the electrodes 41*a* and 41*b*, and a radio-frequency voltage An' having an inversed phase (i.e. phase shift=180 degrees) of the radio-frequency voltage An is applied to the electrodes 41*c* and 41*d*. Here, n indicates the location of the stage from the ions' incoming side, i.e. from the left in FIG. 1(*b*), among the electrodes of the six groups arranged along the ion optical axis C. The radio-frequency voltages An (n=1 through 6) have the same frequency f and amplitude but have different phases. Given that An=V cos(ωt), then An'=V cos(ωt+π)=−V cos (ωt). In general, the range of the frequency f is approximately between some hundreds of kHz and some MHz.

Figure 2:
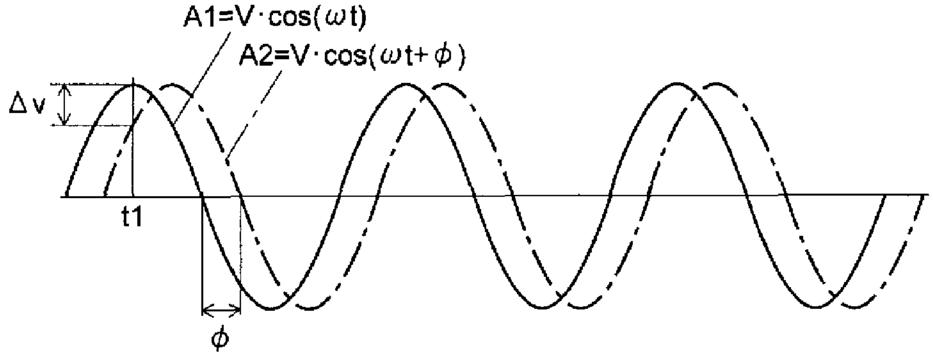
FIG. 2 is a waveform chart showing a relationship between the radio-frequency voltage A1 applied to the electrodes of the first stage and the radio-frequency voltage A2 applied to the electrodes of the second stage in the mass spectrometer according to the first embodiment.

FIG. 2 is a waveform chart showing a relationship between the radio-frequency voltage A1 applied to the electrodes 41*a* and 41*b* of the first stage, i.e. n=1, and the radio-frequency voltage A2 applied to the electrodes 42*a* and 42*b* of the second stage. As illustrated in this figure, the radio-frequency voltage A2 has a phase shift of ϕ from A1. As for the electrodes of the third and subsequent stages, in a similar way, each radio-frequency voltage to be applied has a phase shift of ϕ from the radio-frequency voltage applied to the electrodes of the preceding stage. Therefore, the phase of the radio-frequency voltage is shifted in sequential steps ϕ from the electrodes 41*a* and 41*b* of the first stage to the electrodes 46*a* and 46*b* of the sixth stage along the ion optical axis C. By the radio-frequency voltages A1 and A1' which are applied to the four electrodes 41*a* thorough 41*d* as shown in FIG. 1(*a*), a radio-frequency electric field capable of converging ions is generated in the space surrounded by these electrodes 41*a* thorough 41*d*.

On the other hand, seen along the ion optical axis C direction, owing to the difference of the phases of the radio-frequency voltages applied to the adjacent two groups of electrodes, the radio-frequency electric fields generated by these two groups have a phase difference. Therefore, at a certain point in time, t1 in FIG. 2 for example, a voltage difference Δv occurs between the radio-frequency voltages A1 and A2. For this reason, when the ions introduced into the lens electrode 40 approach the plane with the four electrodes 41*a* through 41*d* of the first stage for example, kinetic energy is given to the ions by the electric field attributable to the aforementioned voltage difference Δv, and the ions are accelerated. As the ions fly forward, they are accelerated in sequence by each voltage difference due to the phase difference between the radio-frequency voltages applied to the adjacent two groups of electrodes. When an ion collides with molecules of residual gas while passing through the lens electrode 40, it is decelerated due to the loss of the kinetic energy as a matter of course. However, owing to the aforementioned acceleration effect, the ions are converged around the ion optical axis C by the radio-frequency electric field and pass thorough the lens electrode without delay.

In the above explanation, the frequency f of the radio-frequency electric voltage applied to each electrode was constant. However, when the mass-to-charge ratio or the range of the mass-to-charge ratio of the ions to be analyzed is determined, the frequency f may be changed in accordance with the mass-to-charge ratio. This enhances the ion converging effect and the ions are effectively sent into the analysis chamber 21 in the subsequent stage. Furthermore, since the acceleration degree varies if the phase shift amount ϕ is altered, it is possible to adjust the phase shift amount in accordance with the mass-to-charge ratio of the ions to send them into the analysis chamber 21 at an appropriate speed.

Second Embodiment

Figure 3:
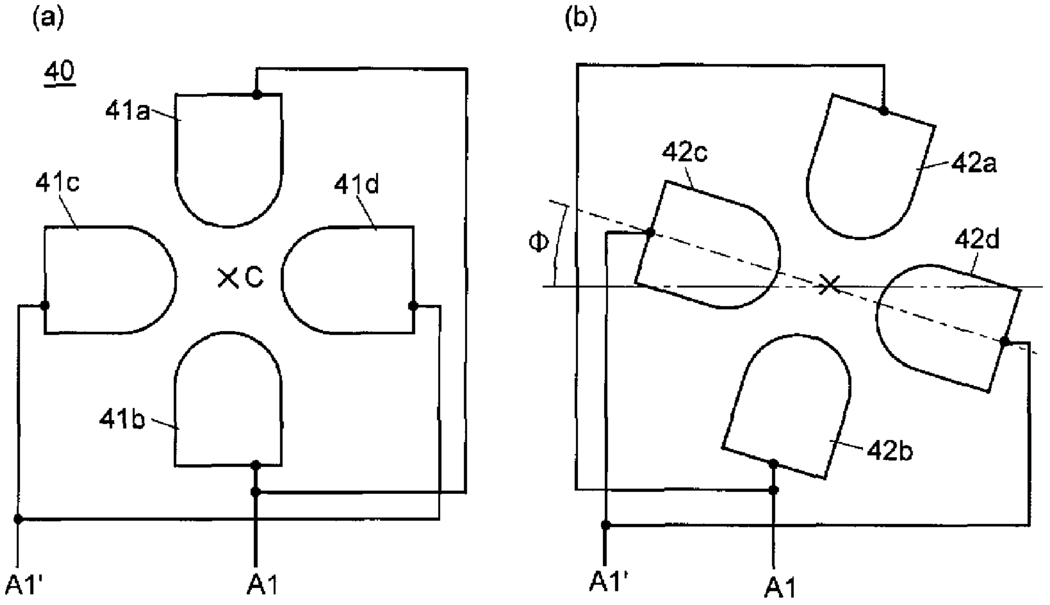
FIG. 3(*a*) shows an arrangement of the electrodes of the first stage of the second lens electrode, and FIG. 3(*b*) shows an arrangement of the electrodes of the second stage of the second lens electrode in a mass spectrometer according to another embodiment of the present invention (the second embodiment).

In the first embodiment as previously described, the phases of the radio-frequency voltages applied to the electrodes of each stage have to be shifted in small steps and a circuit for this operation needs to be built in the voltage-applying circuit. Alternatively, it is also possible to shift the phases of the radio-frequency electric fields by changing the mechanical arrangement of the electrodes using a common radio-frequency voltage to be applied. FIG. 3(*a*) shows an arrangement of the electrodes 41*a* through 41*d* of the first stage of the second lens electrode, and FIG. 3(*b*) shows an arrangement of the electrodes 42*a* through 42*d* of the second stage of the second lens electrode in a mass spectrometer according to the second embodiment having such configuration. In the second embodiment, the arrangement of the four electrodes 41*a* thorough 41*d* of the first stage is the same as that in the first embodiment. However, each of the four electrodes 42*a* through 42*d* of the second stage is rotated by angle ϕ around the ion optical axis C with respect to the four electrodes 41*a* through 41*d* of the first stage.

Similarly, the electrodes of each of the third and subsequent stages are rotated by angle ϕ around the ion optical axis C with respect to the electrodes of the previous stage. With this configuration, each radio-frequency electric field generated in the space surrounded by the electrodes of the second and subsequent stages has a phase shift of ϕ from that of the previous stage, based on the radio-frequency electric field generated in the space surrounded by the four electrodes 41*a* thorough 41*d* of the first stage, and the similar effects of the first embodiment are accordingly achieved. Unlike the configuration of the first embodiment, complicated operations, such as adjusting the phase in accordance with a mass-to-charge ratio, cannot be performed with this configuration; however, the voltage-applying circuit is simplified since there is no need for electrically shifting the phases.

Third Embodiment

Figure 4:
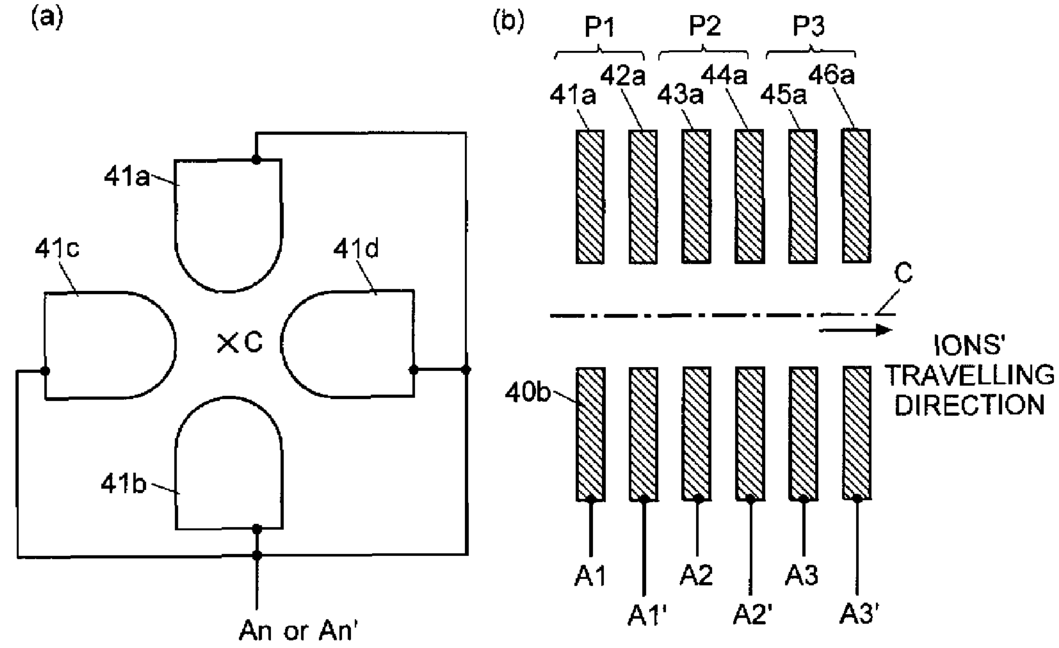
FIG. 4(*a*) is a schematic view of a second lens electrode in a mass spectrometer according to another embodiment of the present invention (the third embodiment) viewed from the incoming direction of ions, and FIG. 4(*b*) is an end view of the same lens electrode viewed with the arrows B-B' of FIG. 4(*a*).

In the aforementioned embodiment, the radio-frequency voltages applied to any two adjacent electrodes among the four electrodes 41*a* thorough 41*d* of the first stage, for example, are in opposite phase. However, the applying method of the radio-frequency voltage may be changed. FIG. 4(*a*) is a schematic view of a second lens electrode 40 in a mass spectrometer according to the third embodiment of the present invention having such configuration viewed from the incoming direction of ions, and FIG. 4(*b*) is an end view of the same lens electrode viewed with the arrows B-B' of FIG. 4(*a*).

As illustrated in FIG. 4, the radio-frequency voltage A1 is uniformly applied to the four electrodes 41*a* through 41*d* of the first stage, and the radio-frequency voltage A1' having an inversed phase with respect to the radio-frequency voltage A1 is applied to the four electrodes 42*a* through 42*d* of the second stage. In this case, a total of eight electrodes of the two adjacent stages are seen as a group, and the phases of the radio-frequency voltage applied to the electrodes of every one stage of the adjacent two groups are shifted. Moreover, the radio-frequency voltage A1' applied to the four electrodes 41*a* through 41*d* of the second stage may be further shifted in phase to a predetermined degree with respect to the radio-frequency voltage having an inversed phase with respect to the radio-frequency voltage A1.

Fourth Embodiment

The second lens electrode 40 in the mass spectrometer of the fourth embodiment has the same configuration as the electrodes in the first embodiment, but the method of applying voltages is changed. That is, although the phases of the radio-frequency electric fields are shifted at each stage along the ion optical axis C in the first to third embodiments as previously stated, a voltage composed of a radio-frequency voltage and a low-frequency voltage superimposed on it is applied to each electrode in the fourth embodiment. Here, the phase of the radio-frequency voltage is not shifted along the ion optical axis C; the radio-frequency voltage A1 or A1' of the first embodiment may be applied to the electrodes of each stage for example. On the other hand, the phase of the low-frequency voltage to be superimposed is sequentially shifted at each stage along the ion optical axis C.

Figure 5:
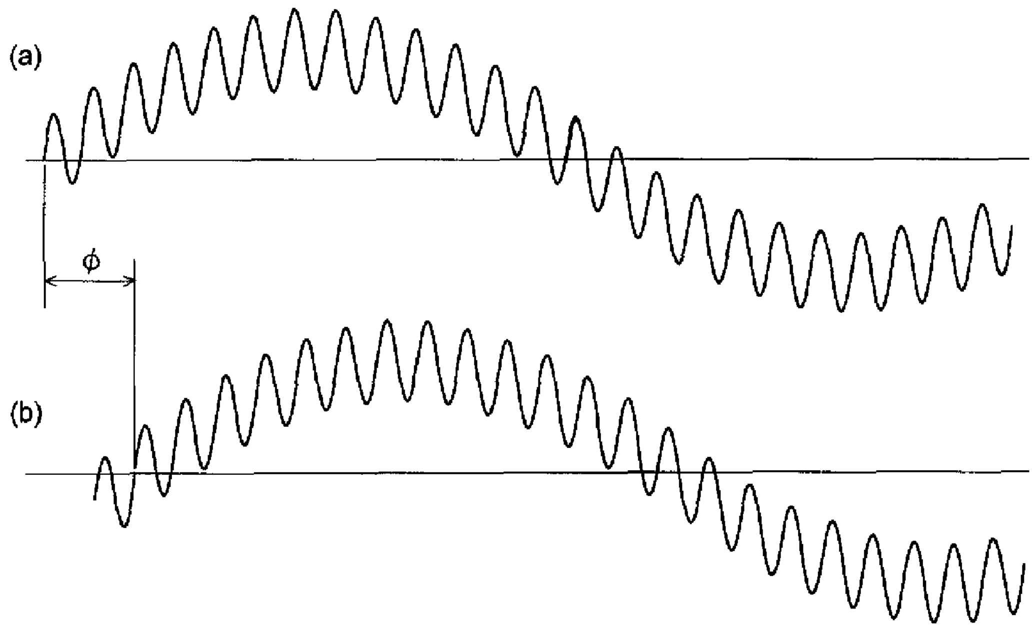
FIG. 5(*a*) shows a waveform of the voltage applied to the electrodes of the first stage, and FIG. 5(*b*) shows a waveform of the voltage applied to the electrodes of the second stage in a mass spectrometer according to another embodiment of the present invention (the fourth embodiment).

FIG. 5(*a*) shows a waveform of the voltage applied to the electrodes 41*a* and 41*b* of the first stage, and FIG. 5(*b*) shows a waveform of the voltage applied to the electrodes 42*a* and 42*b* of the second stage. In this way, if the phase of the low-frequency voltage is shifted instead of the phase of the radio-frequency voltage, an electric field having the effect of accelerating the ions introduced into the lens electrode 40 is generated; the similar effect of the first embodiment is accordingly achieved. The frequency of the low-frequency voltage may be determined in accordance with the intervals between the stages of the lens electrode 40 or with the intended acceleration degree since the frequency of the low-frequency voltage does not affect the conversion of the ions. Normally it is between several tens of Hz and several hundreds of Hz.

The embodiments previously described are mere examples of the present invention. It is apparent that they will be included in the present invention if they are modified, changed, or supplemented within the scope of the present invention.

Figure 6:
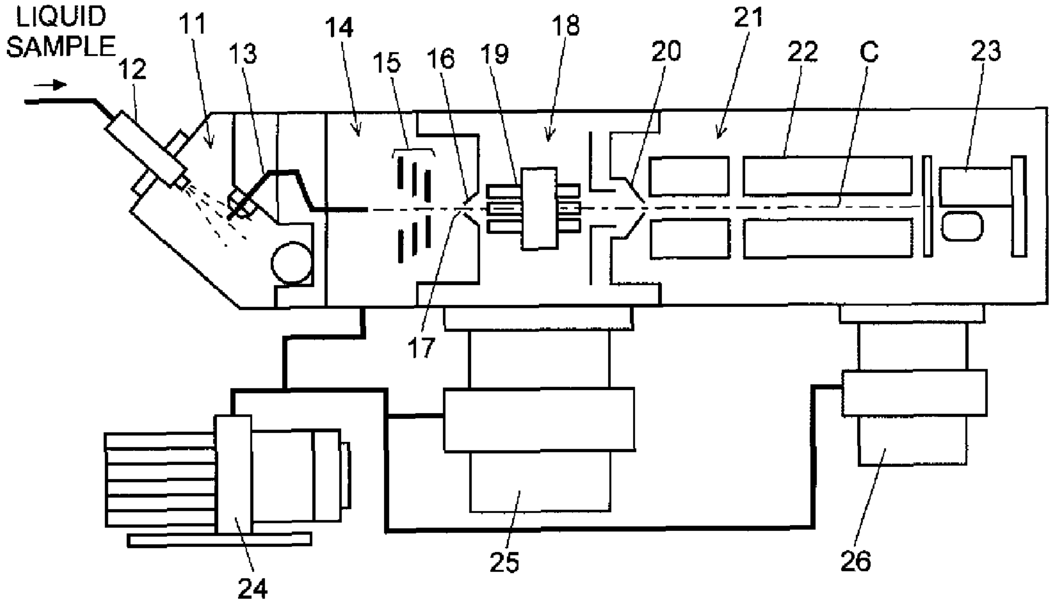
FIG. 6 is a schematic block diagram of the main portion of a conventional LC/MS.
Figure 7:
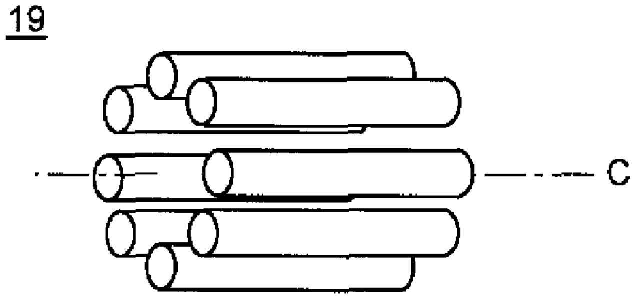
FIG. 7 is a schematic perspective view of a multi-rod type lens electrode.
Figure 8:
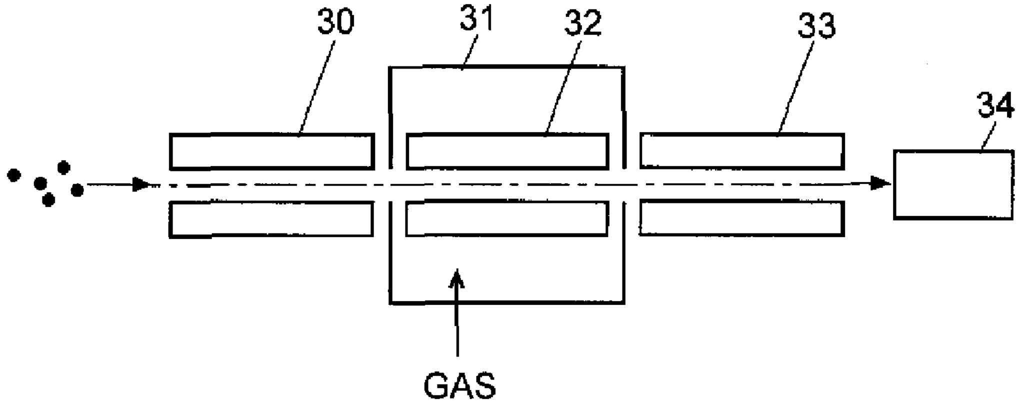
FIG. 8 is a schematic block diagram of the main portion of a conventional tandem mass spectrometer.

For example, in the previous embodiments, the ion optical system of the present invention is applied to one to be located in the intermediate vacuum chamber of a mass spectrometer having the atmospheric ion source as shown in FIG. 6. However, it is also useful for a collision cell of a tandem mass spectrometer as shown in FIG. 8. Moreover, other than these, it may be used in any cases where ions have to be transported to subsequent stages while being converged under the condition of relatively high gas pressure.

The invention claimed is:

1. A mass spectrometer, comprising:

an ion source for generating ions;

a mass analyzer for separating ions with respect to mass-to-charge ratio; and an ion optical system located on an ion passageway between the ion source and the mass analyzer, for converging ions to introduce to the mass analyzer, including plate-shaped electrodes which are thin in an ion optical axis direction and which are arranged so that N plate-shaped electrodes compose a group and M groups align along the ion optical axis (where M is an integral number of three or more, and N is an even number of four or more), and the plate-shaped electrodes are applied radio-frequency voltages having phases shifted along the ion optical axis.

2. The mass spectrometer according to claim 1, comprising a collision cell for making the ions collide with gas molecules so as to accelerate a dissociation of the ion, where the ion optical system is used as the collision cell.

3. The mass spectrometer according to claim 1, wherein:

the ion source has an ionization chamber for ionizing a liquid sample in an atmosphere of atmospheric pressure;

the mass spectrometer has one or plural intermediate vacuum chambers between the ionization chamber and an analysis chamber maintained in a high vacuum atmosphere in which the mass analyzer is located; and the intermediate vacuum chambers are separated from each other by a partition wall, where the ion optical system is located inside the intermediate vacuum chamber.

4. A mass spectrometer comprising:

an ion source for generating ions;

a mass analyzer for separating ions with respect to mass-to-charge ratio; and an ion optical system location on an ion passageway between the ion source and the mass analyzer, for converging ions to introduce to the mass analyzer, where:

the ion optical system comprises M groups of N plate-shaped electrodes which are thin in an ion optical axis direction (where M is an integral number of three or more, and N is an even number of four or more), the N electrodes are arranged around the ion optical axis, the M groups of electrodes are arranged in a multistage form so as to be separated from each other along the ion optical axis direction, and the electrodes of each of the groups are rotated by a predetermined degree around the ion optical axis in sequence along the ion optical axis direction.

5. The mass spectrometer according to claim 4, comprising a collision cell for making the ions collide with gas molecules so as to accelerate a dissociation of the ion, where the ion optical system is used as the collision cell.

6. The mass spectrometer according to claim 4, wherein:

the ion source has an ionization chamber for ionizing a liquid sample in an atmosphere of atmospheric pressure;

the mass spectrometer has one or plural intermediate vacuum chambers between the ionization chamber and an analysis chamber maintained in a high vacuum atmosphere in which the mass analyzer is located; and the intermediate vacuum chambers are separated from each other by a partition wall, where the ion optical system is located inside the intermediate vacuum chamber.

7. A mass spectrometer comprising:

an ion source for generating ions;

a mass analyzer for separating ions with respect to mass-to-charge ratio;

an ion optical system located on an ion passageway between the ion source and the mass analyzer, for converging ions and introducing the ions to the mass analyzer, and the ion optical system comprising M groups of N plate-shaped electrodes which are thin in an ion optical axis direction (where M is an integral number of three or more, and N is an even number of four or more), where the N electrodes are arranged around the ion optical axis, and the M groups of electrodes are arranged in a multi-stage form so as to be separated from each other along the ion optical axis direction; and a voltage-applying unit for applying a voltage in which a radio-frequency voltage and a low-frequency voltage are superimposed to each electrode of each group, where phases of the low-frequency voltages are shifted in sequence along the ion optical axis direction.

8. The mass spectrometer according to claim 7, comprising a collision cell for making the ions collide with gas molecules so as to accelerate a dissociation of the ion, where the ion optical system is used as the collision cell.

9. The mass spectrometer according to claim 7, wherein:

the ion source has an ionization chamber for ionizing a liquid sample in an atmosphere of atmospheric pressure;

the mass spectrometer has one or plural intermediate vacuum chambers between the ionization chamber and an analysis chamber maintained in a high vacuum atmosphere in which the mass analyzer is located; and the intermediate vacuum chambers are separated from each other by a partition wall, where the ion optical system is located inside the intermediate vacuum chamber.

* * * * *